US007748016B2

(12) United States Patent  
Barrett et al.

(10) Patent No.: US 7,748,016 B2
(45) Date of Patent: *Jun. 29, 2010

(54) ELECTRONIC PROGRAM GUIDE DISPLAYED SIMULTANEOUSLY WITH TELEVISION PROGRAMMING

(75) Inventors: Peter T. Barrett, San Francisco, CA (US); Daniel Danker, Hercules, CA (US); Jeffrey D. Yaksick, Sunnyvale, CA (US)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/268,330

(22) Filed: Nov. 10, 2008

(65) Prior Publication Data

US 2009/0070815 A1    Mar. 12, 2009

Related U.S. Application Data

(63) Continuation of application No. 11/676,162, filed on Feb. 16, 2007, now Pat. No. 7,451,469, which is a continuation of application No. 09/854,733, filed on May 14, 2001, now Pat. No. 7,197,759.

(51) Int. Cl.
*G06F 3/00* (2006.01)
*G06F 13/00* (2006.01)
*H04N 5/445* (2006.01)
(52) U.S. Cl. .............................. 725/43; 725/39; 725/44; 725/45; 725/46; 725/61; 715/700; 715/721; 715/784; 715/830
(58) Field of Classification Search ............. 725/43–44, 725/39–61; 715/700, 721, 784, 830
See application file for complete search history.

(56) References Cited

U.S. PATENT DOCUMENTS 5,719,637 A    2/1998    Ohikura (Continued)

FOREIGN PATENT DOCUMENTS

EP    0774866    5/1997

(Continued)

OTHER PUBLICATIONS

Mornington, West A., Some Issues with ESGs Helping the Consumer to Navigate, The Institution of Electrical Engineers (IEE), (Ref No. 1998/419), pp. 1-5, Apr. 1998.

(Continued)

*Primary Examiner*—Christopher Kelley
*Assistant Examiner*—Farzana Hossain
(74) *Attorney, Agent, or Firm*—Workman Nydegger (57) ABSTRACT

A system for displaying an electronic program guide (EPG) to a viewer. The system includes displaying one or more data slices representative of broadcast programming to a viewer. In response to input from the viewer, the displayed number of data slices is increased, for example, from one slice to two slices. In browser mode the viewer can scroll through multiple EPG data slices without selecting to view full mode EPG, while in full mode the EPG can expand from a single column of data slices to multiple columns of data slices based upon viewer selections. The EPGs of the present invention can display programming that a viewer is more likely to watch at a particular time than other programming. A data slice representing the predicted programming can be inserted into the EPG so that the viewer can identify programming that is likely to be of interest.

3 Claims, 7 Drawing Sheets

U.S. PATENT DOCUMENTS

| | | |
|---|---|---|
| 5,801,747 A | 9/1998 | Bedard |
| 5,867,226 A | 2/1999 | Wehmeyer |
| 6,005,631 A | 12/1999 | Anderson |
| 6,064,376 A | 5/2000 | Berezowski |
| 6,163,345 A | 12/2000 | Noguchi |
| 6,169,543 B1 | 1/2001 | Wehmeyer |
| 6,201,536 B1 | 3/2001 | Hendricks |
| 6,425,129 B1 | 6/2002 | Sciammarella |
| 6,499,138 B1 | 12/2002 | Swix |
| 6,526,577 B1 | 2/2003 | Knudson |
| 6,577,350 B1 | 6/2003 | Proehl |
| 6,642,939 B1 | 11/2003 | Vallone |
| 6,704,931 B1 | 3/2004 | Schaffer |
| 6,701,526 B1 | 5/2004 | Trovato |
| 6,756,997 B1 | 6/2004 | Ward |
| 6,851,090 B1 | 2/2005 | Gutta |
| 6,925,650 B1 | 8/2005 | Arsenhault |
| 7,039,935 B2 | 5/2006 | Knudson |
| 7,061,545 B1 | 6/2006 | Kweon |
| 7,096,483 B2 | 8/2006 | Johnson |
| 7,137,135 B2 | 11/2006 | Schein |
| 7,197,759 B2 | 3/2007 | Barrett |
| 7,254,823 B2 | 8/2007 | Knudson |
| 2004/0034867 A1 | 2/2004 | Rashkovskiy |
| 2005/0044565 A1 | 2/2005 | Jerding |
| 2005/0097604 A1 | 5/2005 | Shintani |
| 2005/0193337 A1 | 9/2005 | Noguchi |
| 2005/0229210 A1 | 10/2005 | Akhavan |
| 2006/0031881 A1 | 2/2006 | Barrett |
| 2007/0143793 A1 | 6/2007 | Barrett |

FOREIGN PATENT DOCUMENTS

| | | |
|---|---|---|
| EP | 1094665 | 4/2001 |
| WO | WO 98/56172 | 2/1998 |
| WO | WO 00/48395 | 8/2000 |

OTHER PUBLICATIONS

Tarrant D.R., An Open Eurpoean Standard for an Electronic Programme Guide, The Institution of Electrical Engineers (IEE), Internation Broadcasting Convention, Pub. No. 447, pp. 441-446, Sep. 1997.

Rosengren J., Electronic Programme Guides and Serivce Information, Phillips Journal of Research, vol. 50, No. 1/2, pp. 252-265, 1996.

Ehrmantraut et al., The Personal Electronic Programme Guide—Towards the Pre-Selection of Individual TV Programs, International Conference on Information and Knowledge, pp. 243-250, Nov. 1996.

Office Action dated Oct. 19, 2005 cited in Patent No. 7,197,759.
Office Action dated Mar. 20, 2006 cited in Patent No. 7,197,759.
Notice of Allowance dated Dec. 11, 2006 cited in Patent No. 7,197,759.
Office Action dated Feb. 4, 2008 cited in U.S. Appl. No. 11/241,662.
Office Action dated Jul. 9, 2008 cited in U.S. Appl. No. 11/241,662.
Notice of Allowance dated Aug. 5, 2008 cited in U.S. Appl. No. 11/676,162.
Office Action dated Jul. 20, 2006 cited in Patent No. 7,197,759.
Office Action dated Nov. 5, 2008 cited in U.S. Appl. No. 11/241,662.
Office Action dated May 27, 2009 cited in U.S. Appl. No. 11/241,662.
Notice of Allowance dated Sep. 8, 2009 cited in U.S. Appl. No. 11/241,662.

ELECTRONIC PROGRAM GUIDE DISPLAYED SIMULTANEOUSLY WITH TELEVISION PROGRAMMING

CROSS-REFERENCE TO RELATED APPLICATIONS

This application is a continuation of application Ser. No. 11/676,162 filed on Feb. 16, 2007, and entitled "ELECTRONIC PROGRAM GUIDE DISPLAYED SIMULTANEOUSLY WITH TELEVISION PROGRAMMING", which is a continuation of application Ser. No. 09/854,733, filed May 14, 2001, now U.S. Pat. No. 7,197,759, issued Mar. 27, 2007, and entitled "ELECTRONIC PROGRAM GUIDE DISPLAYED SIMULTANEOUSLY WITH TELEVISION PROGRAMMING". This application is also related to U.S. application Ser. No. 11/241,662 filed Sep. 30, 2005, and entitled "ELECTRONIC PROGRAM GUIDE DISPLAYED SIMULTANEOUSLY WITH TELEVISION PROGRAMMING". All of the foregoing applications are incorporated here by reference.

BACKGROUND OF THE INVENTION

1. The Field of the Invention

The present invention relates generally to schedules for programming information viewed upon a display screen. More specifically, the present invention relates to systems and methods for providing an enhanced electronic program guide manipulatable to vary the programming information presented to an individual, such as a viewer.

2. The Prior state of the Art

As communication technology continues to expand, individuals have an increasing number of available programs and services accessible from the individual's home, office, or other location. For example, many cable and satellite television services offer dozens if not hundreds of different channels from which the individual or viewer may choose. The dramatic increase in the amount of available broadcast programming and other services greatly increases the amount and type of available information accessible by a viewer. Unfortunately, the increase and quantity of information, e.g., broadcast programming and services, complicates the process of program and service selection. Unless a viewer is able to quickly and easily identify desired programs and services and determine when those programs and services are available, most viewers will not realize the full potential for using and accessing the available wealth of knowledge and entertainment.

Typically, a viewer identifies the availability of broadcast programming and services by way of an electronic program guide ("EPG"). The EPG provides the viewer with a schedule of broadcast programming and services presented as a time-based grid; time blocks commonly being arranged as columns, while different channels and services are arranged in rows. Commonly, program titles are displayed in the grid at the intersection of the time at which the program airs and the channel on which the program is broadcast. Alternatively, some EPGs provide a list of programming on a per channel basis, with the time period associated with the broadcast programming or services incorporated within a portion of the display.

When programming schedule information is requested, typically, the EPG is substituted for the current programming. In such a case, the EPG is termed to be in full mode and displays multiple "slices" of programming information to the viewer. Each "slice" includes a channel identifier, programming information, and one or more time period entries. For example, many existing EPGs display the programming information on a three or four half-hour time period basis, beginning with a current half-hour time period and extending to approximately two hours from the beginning time period. The programming information for multiple channels may be displayed to the viewer either automatically as the EPG scrolls through the available broadcast programming and service information in numeric order or alternatively the full mode EPG may allow a viewer to manually scroll through the available channel information.

In contrast to full mode, some EPGs may display to a viewer only a single "slice" of programming information, typically at the bottom of the display screen. The EPG is termed to be operating in a browser mode. Such single "slice" of programming information displays the details of the programming currently viewed or accessed on a particular channel. For example, if the channel is Channel 5 and local news broadcast programming is displayed to the viewer, the "slice" provides the viewer with start and stop times for the local news on Channel 5. To obtain additional information for other channels, it is typically necessary to access the EPG in full mode.

With advances in digital cable systems, some EPGs allow a user to scroll through various single slices of broadcast programming and service information in browser mode. For example, while a viewer watches a particular channel, the viewer may change the single "slice" representation of the broadcast programming or service on the channel currently viewed to a "slice" containing information for a preceding or subsequent channel. Additionally, the viewer may scroll on a time period basis and substitute the current time period displayed in the browser mode for subsequent time periods.

Although current advances with electronic program guides provide a viewer with flexibility in viewing broadcast programming information, there are still significant problems. For example, as implied above, to view multiple "slices," it is currently necessary to switch from browser mode to full mode and search through all of the available broadcast programming or services to identify programming or services desired by the viewer. This process becomes more tedious when the viewer must scroll through the same broadcast programming and services repeatedly for the same period of time on subsequent days or weeks to obtain desired broadcast programming or services.

Further, it may become tedious to access broadcast programming and service information for a certain type of programming or services that a viewer commonly watches or access over a long period of time, such as every day or week. Similarly, it is difficult to access or view the relevant information for a type of programming or services available at a particular time period when a viewer is unaware of the availability of such programming and/or services. For example, a sports enthusiast may be unaware of the transmission of a sport special during the transmission of other broadcast programming. The current manner by which a viewer may identify the availability of broadcast programs and/or services is to scroll through the available programming and/or service information or watch as the EPG automatically scrolls through the available programming and/or service information.

It would therefore be an advance to provide methods and systems that generate more manipulable electronic program guides that give programming information to viewers in a simple and efficient manner.

SUMMARY OF THE INVENTION

As disclosed previously, existing electronic program guides may be viewed in either browser mode or full screen or mode. In browser mode, a viewer can watch substantially all of the available display screen while searching through one or more slices of programming information for programs and services concurrently or subsequently available to the viewer. In full mode, a viewer can search multiple slices of programming information, however, the viewer is typically unable to watch programming concurrently with performing searching activities. To overcome limitations associated with concurrent viewing of programming and electronic program guides and the need to scroll through multiple slices of programming, disclosed herein are systems and methods for providing an expandable browser mode electronic program guide. Further, to overcome other limitations associated with searching electronic program guides, an expandable full mode electronic program guide and a programming guide capable of predicting which program of the available programming that a viewer may wish to watch at a particular time period are disclosed herein.

According to one aspect of the present invention, disclosed herein are numerous methods for displaying an electronic program guide to a viewer while television programming is substantially viewable by the viewer. Further, disclosed herein are numerous methods for selectively expanding a full mode electronic program guide in accordance with a viewer's selections. Additionally, disclosed herein are numerous methods for displaying an electronic program guide in a predictive manner to a viewer.

Illustratively, one method of the present invention includes retrieving electronic program guide data from a data source. The data source can be local or remote to the display device upon which the electronic program guide is displayed. The electronic program guide data includes one or more data slices, each of which represents data related to the available programming displayable upon the display device. The method further includes displaying at least one data slice of the electronic program guide to the viewer. This can be achieved by displaying the data slices upon the display device while the currently viewed programming is substantially displayed to the viewer. Following displaying the data slices, the method includes expanding the at least one data slice to at least two data slices, in response to a selection by the viewer, while substantially displaying the programming to the viewer. In this manner, the electronic program guide allows a viewer to search and examine a number of different data slices of the electronic program guide without the need to revert to viewing a full mode configuration of the electronic program guide, such as is necessary with currently available electronic program guides.

In another configuration, the present invention includes a method for allowing a full mode electronic program guide to expand as a user searches through the electronic program guide data. The method includes retrieving electronic program guide data from a data source. The electronic program guide data includes one or more data slices, each of which represents data related to the available programming displayable upon the display device. The method further includes displaying a single column of the available data slices within a full mode electronic program guide. The electronic program guide, consequently, displays a single column of program data for the broadcast programming currently available on each channel deliverable to the viewer. Substantially simultaneously with displaying the single column of data slices, the method provides for displaying advertisements, navigational controls, summaries of available programming, or the like. Following displaying the data slices in a single column, the method can include expanding the signal column of data slices, in response to a selection by the viewer, to a plurality of columns of data slices in a two axis grid type configuration searchable in both the horizontal and vertical directions. In addition, the method provides for optionally hiding the advertisements, navigational controls, summaries, or the like to increase the viewable area of the electronic program guide in the expanded mode. In this manner, the electronic program guide allows a viewer to search and examine a number of different columns and data slices of the electronic program guide. Optionally, the method provides for reducing the electronic program guide from a plurality of columns of data slices to the single column of data slices upon a viewer returning to the column containing electronic program guide data representative of the currently available programming on each channel.

According to another aspect of the present invention, an illustrative method may include retrieving an electronic program guide that has a plurality of data slices representing a plurality of programs. This may be achieved by accessing a local or remote storage device or memory that contains multiple data slices associated with one or more electronic program guides. Following retrieval of the electronic program guide, the method includes predicting at least one program that a viewer is more likely to watch at a particular time than other programs at the particular time. This may include identifying information regarding the viewer, such as viewer preferences and/or demographic information to define predictive criteria. Such predictive criteria is used to define the type(s) of programming that a viewer may watch, and consequently identify data associated with the programs that a viewer is more likely to watch.

Based on predicting the programming, data slices representing the predicted programs are inserted into one or more display screens associated with the electronic program guide. Consequently, in response to input from the viewer selecting a particular one of the display screens, the selected display screen, including the at least one data slice, are displayed to the viewer using the display device. In this manner, data slices of the electronic program guide that represent the type of program that a viewer may wish to view are displayed to the viewer, thereby aiding the viewer with the selection of particular program to watch. This is in contrast to current electronic program guides that require the viewer to scroll through a substantial number of data slices to thereby identify the availability of the type of program that the viewer wishes to watch.

According to another aspect of the present invention, various methods for providing and selecting, such as in a predictive manner, slices from an electronic program guide displayed on a display device are disclosed herein. Illustratively, such a method includes retrieving a plurality of data slices for the electronic program guide, each of which represents data of the available programs viewable upon the display device. While one of the available programs is displayed on the display device, the corresponding data slice that represents the displayed program is also displayed on the display device. A viewer can provide input that causes the number of viewable data slices to change, so that a variable number of data slices are presented to the viewer. Consequently, this illustrative method allows a viewer to vary the number of slices that are displayed in the browser mode electronic program guide, in contrast to the existing browser mode electronic program guides that are incapable of displaying multiple data slices simultaneously.

In this manner, the presently described invention can provide electronic program guides that allow a viewer to search multiple viewable slices of program information while concurrently viewing programming. Further, the presently describe invention can provide expandable electronic program guides in full mode. Also, the presently described invention may provide electronic program guides that predict programming that a viewer may watch and subsequently display programming information related to such programming to the viewer in a simple and effective manner.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention may be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE INVENTION

The present invention extends to both systems and methods for providing an enhanced electronic program guide ("EPG") that is capable of displaying to a viewer multiple slices of programming and services, on both a channel basis and time period basis, in browser mode and/or full mode. Further, the EPG optionally dynamically predicts and presents to the viewer information related to suggested available programming for a given time period based upon predictive criteria. In this manner, the EPG of the present invention aids the viewer with the selection of available programming and services for a particular time period.

1. Exemplary Operating Environment

The electronic program guide of the present invention may be incorporated within or otherwise used with a special purpose or general purpose computer, including computer hardware as discussed in detail herein. Set-top boxes that enhance the capabilities of conventional televisions represent an example of one type of special purpose computer that may benefit from the electronic program guide of one embodiment of the present invention. Other embodiments may include multiple computers, whether special purpose or general purpose, that are linked in a networked environment, as understood by one skilled in the art in light of the teaching contained herein.

Illustratively, embodiments within the scope of the present invention may also include computer-readable media for carrying or having computer-executable instructions or data structures stored thereon. Such computer-readable media may be any available media that may be accessed by a general purpose or special purpose computer. By way of example, and not by limitation, such computer-readable media may comprise physical storage media such as random access memory (RAM), read only memory (ROM), electrically erasable programmable read-only memory (EEPROM), compact disk read only memory (CD-ROM) or other optical disk storage, magnetic disk storage or other magnetic storage devices, or any other medium that may be used to carry or store desired program code means in the form of computer-executable instructions or data structures and that may be accessed by a general purpose or special purpose computer. When information is transferred or provided over a network or another communications connection (either hardwired, wireless, or a combination of hardwired or wireless) to a computer, the computer properly views the connection as a computer-readable medium. Thus, such a connection is also properly termed a computer-readable medium. Combinations of the above should also be included within the scope of computer-readable media. Computer-executable instructions comprise, for example, instructions and data which cause a general purpose computer, special purpose computer, or special purpose processing device to perform a certain function or group of functions.

The invention will be described in the general context of computer-executable instructions, such as program modules, being executed by set-top boxes or other computers. Generally, program modules include routines, programs, objects, components, data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Figure 1:
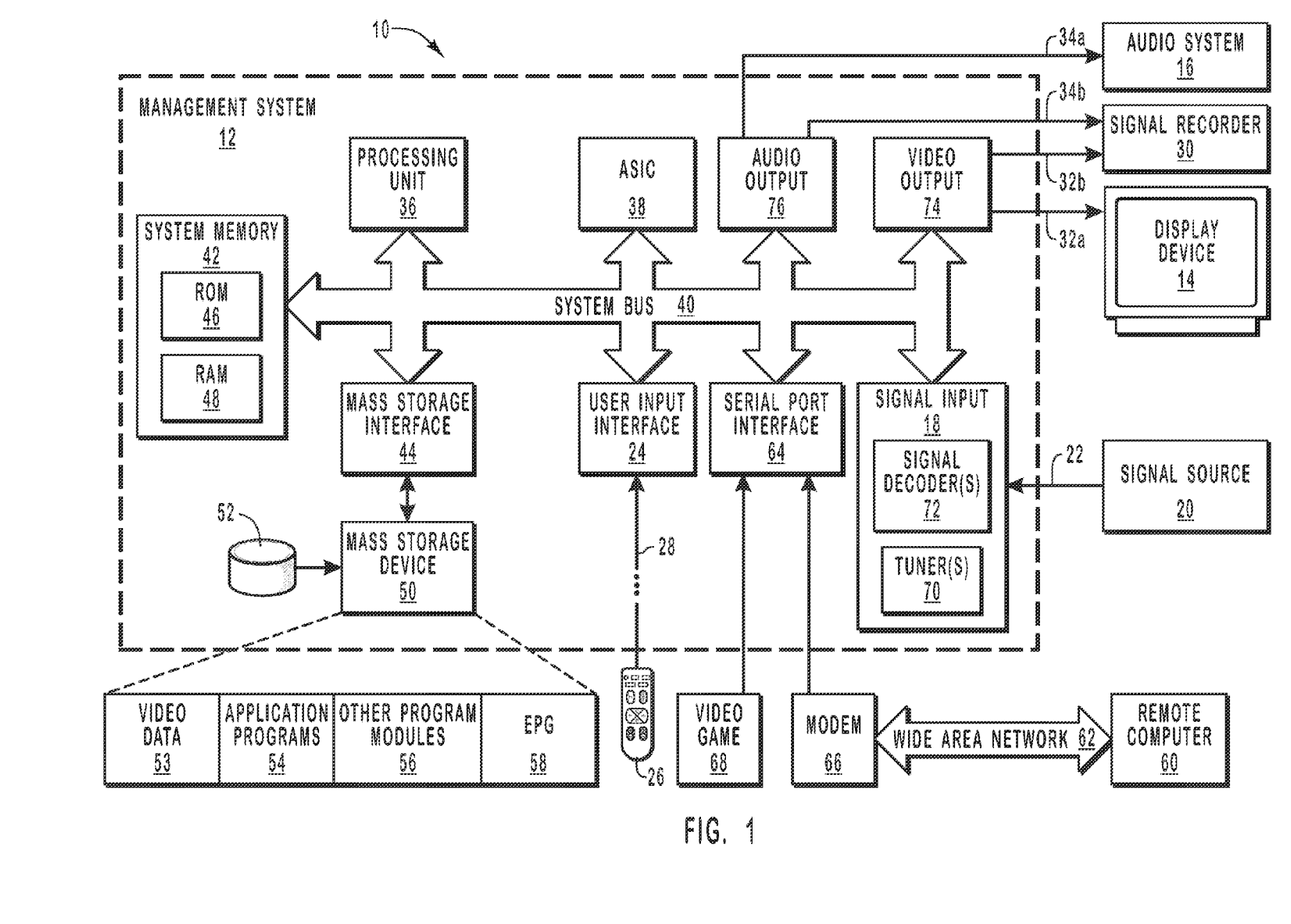
FIG. 1 illustrates an exemplary system that provides a suitable operating environment for the present invention.

FIG. 1 and the corresponding discussion are intended to provide a general description of a suitable environment in which the invention may be implemented. In the discussion, reference is made to a home entertainment system that may be used for displaying and/or recording programming. For purposes of this description and in the claims, a "home entertainment system" may be a display unit, such as a television screen, coupled to a processing device for performing the data processing steps disclosed herein. Further, the "home entertainment system" may be any number of interconnected consumer electronic devices, one of which includes a processing device for performing the data processing steps disclosed herein. Examples of such consumer electronic devices include a video cassette recorder ("VCR"), a video game system, a stereo system, a television or monitor with data processing capabilities, a cable television box, a digital satellite system receiver ("DSS"), a digital video broadcasting system ("DVB"), a digital versatile disc system ("DVD"), a set-top box that serves as an Internet terminal, and any other devices capable of processing data as described herein or otherwise facilitating access to programming and services.

The term "home entertainment system" is to be understood and broadly describes a television-viewing environment, whether such system is located in a viewer's home, at a place of business, in the public, or at any other location. In addition, for purposes of this description and in the claims, the term "programming" includes the viewable portions of moving image data, the audible portions of sound data, combinations of both the viewable portions of the moving image data and associated sound data, services accessible through management system 12, and the like.

In one embodiment, the present invention is implemented in a system that uses a conventional television screen or other display unit to display information and includes a WebTV® set-top box or a similar Internet terminal. Such set-top box and Internet terminal is adapted to perform various operations that include composing, sending and receiving email, browsing the World Wide Web ("Web"), accessing other segments of the Internet, and otherwise displaying information. An Internet terminal typically uses standard telephone lines, Integrated Services Digital Network (ISDN) lines, cable lines associated with cable television service, or the like to connect to the Internet or other wide area networks. Alternatively, the present invention may be implemented in any system the may benefit from an EPG that displays multiple slices of programming information to a viewer in browser mode. Similarly, the present invention may be executed in any system that may benefit from an EPG that optionally predicts the particular programming that a viewer may watch or request at a particular time period based upon previously watched or requested programming.

FIG. 1 illustrates a home entertainment system 10 that includes a management system 12, a display device 14, and an audio system 16. Management system 12 may be a set-top box or Internet terminal that has been adapted to perform the operations disclosed herein. Such management system 12 may also perform other typical functions related to delivering programming and services to a viewer, such as but not limited to interactive television experiences.

Management system 12 may be integrally positioned with or separate from display device 14. The display device 14 may be a high definition television display, a standard television display, a flat panel display, a projection device, a high definition television display, a computer monitor, or any other device capable of displaying viewable video image data. Audio system 16 may be a speaker, a stereo system, or any device capable of emitting sound data, and similarly may be integrally positioned with or separate from display device 14.

As illustrated, management system 12 includes a signal input 18 that receives programming from a signal source 20. The programming is transmitted from signal source 20 to signal input 18 via a programming input line 22. Such programming input line 22 may be one of a variety of communication line connections known to one skilled in the art. For example, programming input line 22 may be a cable or optic connection, a connection via a terrestrial antenna system, a satellite system, a wireless system, an electromagnetic radiation system or any device or system capable of transmitting programming to home management system 12.

The signal source 20 may be either a single channel signal source or a multiple channel signal source. A single channel signal source provides programming from a recorded medium, such as a videocassette, compact disc, etc. Examples of a single channel signal source include a VCR, a DVD, and the like. Alternatively, a multiple channel signal source includes any system or device that is capable of sending a signal that may be received by a satellite receiver, a cable or optic connection, a terrestrial antenna, or the like. Examples of a multiple channel signal source include DSS/DVB, a cable box, locally programming (i.e., programming broadcast using UHF or VHF), and the like.

While FIG. 1 illustrates home entertainment system 10 as having a single programming input line 22 and a single signal source 20, one skilled in the art may understand that home entertainment system 10 may include a plurality of programming input lines that transmit programming from a plurality of signal sources. In such embodiments, home entertainment system 10 may receive the programming or services from one signal source or from a plurality of signal sources at a time.

Management system 12 may also include a user input interface 24, which receives input from an input device 26, such as a remote control, keyboard, microphone, or any other device capable of generating instructions to control management system 12, such as electronic instructions. Input device 26 is communicatively coupled to management system 12 over an input link 28 to enable such control. Input device 26 may generate electronic instructions over input link 28 in response to a viewer pressing buttons on input device 26. Optionally, input device 26 may generate and delivery user defined or stored electronic instructions over input link 28 in response to a viewer pressing a single button thereon. For instance, input device 26 may be programmed to turn on home entertainment system 10 and to tune management system 12 to a channel upon depressing of a single button. Further, input device 26 may generate electronic instructions for management system 12 in response to preprogrammed data activated by commands received through a microphone or some related input device. In still another configuration, input device 26 may control Web browser software within management system 12, such as when management system 12 is a set-top box or an Internet terminal.

FIG. 1 illustrates a signal recorder 30, which is capable of receiving video and/or audio data and recording the data on a storage medium. Video signals are transmitted to signal recorder 30 and/or display device 14 by video image link 32, examples of which include a radio-frequency ("RF") link, an S-video link, a composite link, or any other equivalent form of video image link. Similarly, audio link 34 transmits audio data from management system 12 to audio system 16 or to signal recorder 30.

The operation of management system 12 may be controlled by a central processing unit ("CPU"), illustrated as processing unit 36, which may be coupled to an application-specific integrated circuit ("ASIC") 38 and use computer-executable instructions implemented in software and/or hardwired logic circuitry. Processing unit 36 and ASIC 38 may be coupled via a system bus 40, which interconnects various other system components, such as but not limited to the system memory 42, mass storage interface 44, user interface 24 and signal input 18. Processing unit 36, in this illustrative configuration, executes software designed to implement features of management system 12 including features of the present invention.

ASIC 38 contains circuitry that may be used to implement certain functions of management system 12 as understood by one skilled in the art in view of the teaching contained herein.

Instructions, data, and other software used for the operation of processing unit 36 and ASIC 38 may be stored in the system memory 42, such as in read-only memory ("ROM") 46 and/or in random-access memory ("RAM") 48, and/or in a mass storage device 50, which is coupled to mass storage interface 44. ROM 46, RAM 48 and mass storage device 50 may be communicatively coupled to ASIC 38 so as to be readable by ASIC 38 and so that data may be written from ASIC 38 to RAM 48 and possibly mass storage device 50.

Mass storage device 50 may be a magnetic hard disk 52 or any other magnetic or optical mass memory device that is capable of storing large amounts of data. Any desired computer-readable instructions or data, including application programs 54, other program modules 56, and an electronic program guide ("EPG") 58, which specifies the broadcast times and channels of programs may be stored in mass storage device 50. Mass storage device 50 may also be used to record video data 53, in which case, management system 12 acts as a digital video recorder.

EPG data may be obtained in a variety of manners from a variety of different data sources. For instance, the EPG data may be supplied to management system 12 by a remote computer 60 and stored on mass storage device 50. Remote computer 60 is one example of a data source and may take the form of a single local or remote server. Optionally, remote computer 60 may include a plurality of servers, whether or not such servers are local, remote, or a combination thereof. In the case where multiple servers are remote both from one another and from management system 12, such servers may communicate one with another via various communication line connections. For example, the communication line connection may include communication line connection through existing broadcast technology, including television broadcast over the airwaves, cable or cable modems, satellite, telephone lines, whether analog or digitally based, the Internet, DSL, an asymmetric digital subscriber line (ASDL), G.Lite, wireless technology, infra-red (IR) technology, other high-speed data connections, or any other suitable transmission technology or medium known to one skilled in the art.

The EPG data received by management system 12 may be supplied on a regular basis to continually maintain a current schedule of programming at the management system 12. Where management system 12 is associated with the Internet, the data included in the FPG may be downloaded from the Internet. Alternatively, the EPG may be delivered to the home entertainment system by using a direct-dial communication over standard telephone lines, or by using data transmission over the cable television infrastructure, a satellite network, an over-the-air broadcasting or any other available medium or communication line connection.

In the embodiment where management system 12 is associated with the Internet, management system 12 may communicate with remote computer 60 via a wide area network ("WAN") 62 by including a serial port interface 64 that is interposed between system bus 40 and a modem 66. One skilled in the art may appreciate that various other communication line connections are appropriate for allowing communication between management system 12 and remote computer 60, as described and understood in light of the teaching contained herein.

While serial port interface 64 may be utilized to connect a modem 66 for communicating across a WAN, serial port interface may also be utilized to connect other consumer electronic devices, such as video game 68, and/or various input devices, such as a keyboard (not shown) or joystick (not shown), to management device 12. It may be appreciated by one skilled in the art that management system 12 may use various other types of interface to allow management system 12 to communicate with consumer electronic devices, input devices, signal sources, and the like. For example, management system 12 may include a parallel interface, a universal serial bus (USB) interface, a small computer system interface (SCSI), and the like.

Referring now to signal input 18, if the signal on programming input line 22 includes multiple channels, a tuner 70 included in signal input 18 tunes to a selected channel in the signal. Multiple tuners 70 may be used to provide enhanced viewing features, such as picture in picture, recording one channel while viewing another, and recording a plurality of channels simultaneously. A signal decoder 72 converts video data from an analog format to a digital format, or from a digital format to an analog format, in the event that ASIC 38 and tuner 70 employ different formats. Video decoder 72 may also decode video data from a compressed video format (e.g. MPEG). In embodiments where the management system 12 includes multiple tuners 70, management system 12 may also include multiple signal decoders 72 to perform the operations disclosed herein.

Management system 12 may also include a video output 74, which may include a video encoder and/or a video converter. The video encoder assigns a code to frames of video data that are transmitted across a video image link 32 and switches between analog and digital formats. Similarly, audio output 76 may include an audio converter to provide the necessary switching between analog and digital formats.

While FIG. 1 and the corresponding discussion above provide a general description of a suitable environment in which the invention may be implemented, it will be appreciated that the features of the present invention disclosed herein may be practiced in association with a variety of different system configurations.

2. Browser Mode Electronic Program Guides

Figure 2:
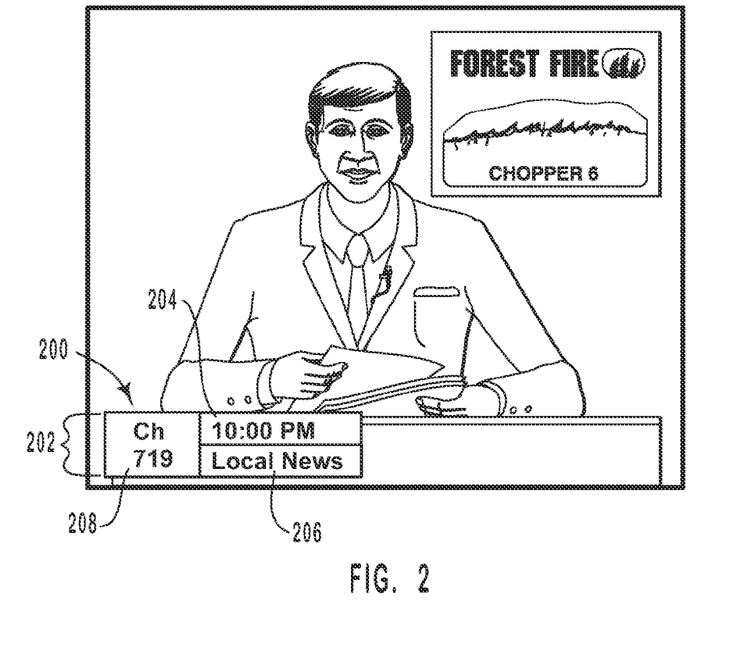
FIG. 2 illustrates an electronic program guide that may be displayed using the system of FIG. 1.

Referring now to FIG. 2, a diagram illustrating one embodiment of an electronic program guide 200 associated with home entertainment system 10 is illustrated. The electronic program guide 200 is illustratively depicted in browser mode, which allows a viewer to inspect programming information contained in electronic program guide 200 while watching programming upon or using services accessible through display device 14.

The electronic program guide 200 illustratively includes a single data slice of programming information displayed to the viewer via a display screen that partially blocks the programming viewable upon display device 14 in a translucent or opaque manner. Slice 202 includes a time element 204 that designates a particular time period for the programming named in a programming element 206 for the channel referenced by a channel element 208. As illustrated, time element 204 may indicate the start time for the programming or services identified in programming element 206. Alternatively, time element 204 may indicate the stop time, both the start time and the stop time, the start time and the air time for the programming or services titled in programming element 206, and the like.

The display configuration illustrated in FIG. 2 shows the initial configuration of electronic program guide 200 of the present invention. A typically available EPG in browser mode may have a similar display configuration as that shown in FIG. 2; however, the capabilities of electronic program guide 200 of the present invention far exceed existing available browser mode abilities, as may be understood in light of the teaching contained herein.

As mentioned above, commonly available EPGs only provide a single slice of programming information. To view other programming information, typically a viewer uses input device 26 to scroll from one slice of viewable programming information to another viewable slice while the preceding viewable slice of programming information is eliminated from view. As a viewer scrolls through programming with a typical EPG in browser mode, each time element 204, programming element 206, and channel element 208 changes to depict the relevant programming information for the channel preceding or subsequent to that channel for which the programming information was initially retrieved. For example, if the EPG displayed time, programming, and channel information for channel 5, upon activating one or more buttons of input device 14, the EPG would display a single slice of programming information associated with channel 4 or 6, or some other subsequent or preceding channel.

In contrast to typical EPGs that are capable of displaying only a single slice of programming information, electronic program guide 200 of the present invention is capable of displaying multiple slices of programming information to a viewer while electronic program guide 200 is in browser mode.

Figure 3:
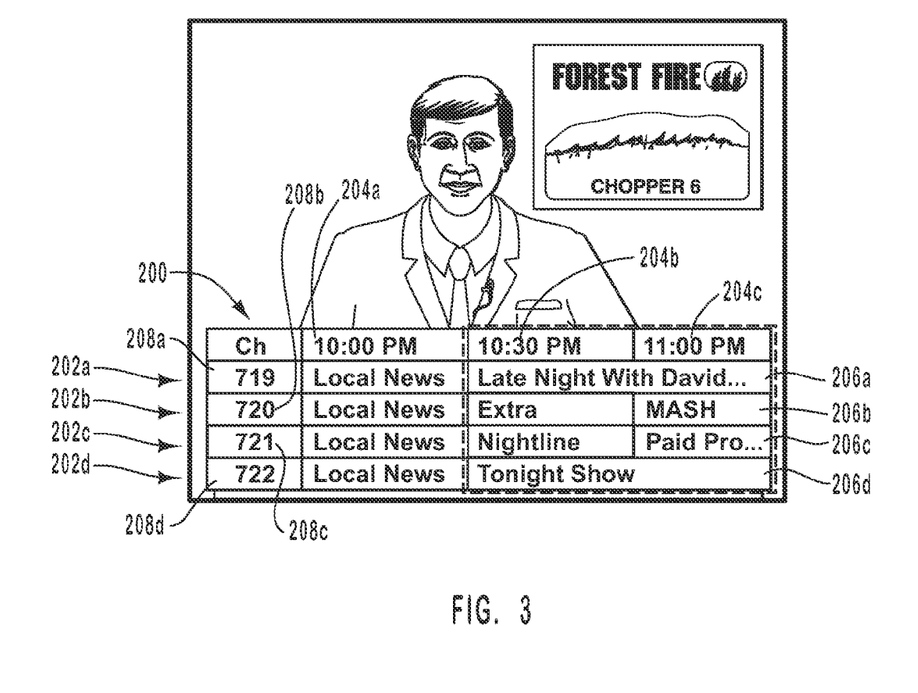
FIG. 3 illustrates the electronic program guide of the present invention in an enhanced mode.

Electronic program guide 200, as shown in FIG. 3, is in an enhanced mode or configuration where multiple slices 200a-200d of programming are displayed to a viewer. In this manner, the viewer may identify the availability of programming without changing to a full mode type configuration. Although only four slices 202a-202d are depicted, it may be appreciated by one skilled in the art, that electronic program guide 200 may allow for a greater or fewer number of slices to be displayed to the viewer. For example, a viewer through management system 12 and/or input device 26 may define the number of slices to be displayed on display device 14. Alternatively, the number of slices may be predefined within management system 12 and/or input device 26 with the viewer being unable to vary the maximum number of viewable slices contained within the display screen.

Each slice 200a-200d of electronic program guide 200 may includes a programming element 206a-206d, a channel element 208a-208d, and optionally a time element 204a-204c. Each programming element 206a-206d of electronic program guide 200 is configured to contain information regarding the programming available on the channel defined in channel elements 208a-208d for the given time periods defined within time elements 204a-204c. Such information may include the title of the available programming, a brief summary of the programming, length of programming and/or services, costs associated with the available programming and/or services, combinations thereof and the like. Optionally, each programming element 206a-206d may be linked to one or more other display screens (not shown) that contain additional information regarding the programming referenced within each programming element 206a-206d. Further, in some configurations, electronic program guide 200 is devoid of time elements 204a-204c and channel elements 208a-208d, with such time and channel data incorporated and displayed within programming elements 206a-206d.

As understood by one skilled in the art, each channel element 208a-208d contains data regarding a particular channel on which the programming defined in programming elements 206a-206d is to be broadcast. For example, in a digital configuration, each channel element 208a-208d includes a numerical identifier that designates a channel upon which management system 12 displays the data and information transmitted upon a particular MPEG stream.

Each time element 204a-204c includes data representative of the times when programming or services are available to a viewer. The time data may be on a half-hour basis, such that each time element 204a-204c may reference a one-half hour period. For example, as illustrated, time element 204a depicts the 10:00 pm time block, while optional time elements 204b and 204c represent the 10:30 pm and 11:00 pm time blocks respectively. Alternatively, each time element 204a-204c may represent a different period, such as fifteen minutes, an hour, and the like.

FIG. 3 illustrates enhanced electronic program guide 200 in a fully expanded configuration, both with respect to the number of channels and with respect to the available time period. When a viewer initially activates electronic program guide 200 in browser mode, in one configuration, electronic program guide 200 is displayed to the viewer in a form and configuration similar to that illustrated in FIG. 2. That is, a single time element 204, a single programming element 206, and a single channel element 208. In other configurations, electronic program guide 200 may initially depict two or more slices of programming, including the appropriate time elements 204a-204n, programming elements 206a-206d, and channel elements 208a-208d.

As a viewer wishes to view additional programming information, such as broadcast information for channels different from the currently viewed channel for the same time period, the viewer may use input device 26 to scroll upwardly or downwardly through the list of channels to expand the number of slices viewable within the display screen of electronic program guide 200. For example, the viewer may manipulate buttons on input device 26, vocalize the scroll direction by which the programming is to travel, or the like.

In response to the request for additional programming information, electronic program guide 200 expands the displayed number of slices on a slice-by-slice basis to the defined number of slices viewable in browser mode, such as to the fully expanded configuration illustrated in FIG. 3. Consequently, upon scrolling upwardly or downwardly a second slice is displayed to the viewer. Each time a viewer scrolls upwardly or downwardly to obtain a new slice not currently viewable to the viewer, management system 12 inserts a slice into the displayed electronic program guide 200 until the maximum number of viewable slices is reached. Optionally, when the viewer begins to scroll upwardly or downwardly through the available slices, the maximum number of slices is automatically displayed to the viewer with relevant programming information contained within the appropriate time elements 204a-204c, programming elements 206a-206d, and/or channel elements 208a-208d. This is in contrast to a typical EPG in browser mode that maintains a single viewable slice, while changing the information contained therein.

As a viewer continues to scroll through the programming slices, the information contained within programming elements 206a-206d and channel blocks 208a-208d is updated by management system 12 so that a viewer may scroll through the available programming information. In an alternate configuration of the present invention, the programming information for one slice of the displayed slices, such as slice 202a, maintains the programming information for the channel currently being viewed by the user through display device 14. In such as scenario, the other slices 202b-202d displayed to the viewer contain the programming information for the other channels scrolled through by the viewer.

According to another aspect of the present invention, electronic program guide 200 depicted in FIG. 3 illustratively depicts the situation where the time periods of electronic program guide 200 are expanded to allow a viewer to scroll on a time period-by-time period basis, as shown by the dotted lines surrounding programming information related to time elements 204b-204c. In this configuration, a viewer may scroll through proceeding or subsequent times for the programming displayed within the electronic program guide 200. This is the case, even if electronic program guide 200 displays a single slice or multiple slices of programming.

In this manner, a viewer may use a combination of both channel scrolling and time period scrolling to view any programming information available through typical electronic program guides. Therefore, a viewer may obtain the same experience as a full screen mode electronic program guide without the need to substitute the electronic program guide for the current programming. Subsequently, the viewer is able to continually view a particular programming or participate in service while searching through subsequent and preceding programming information.

Figure 4:
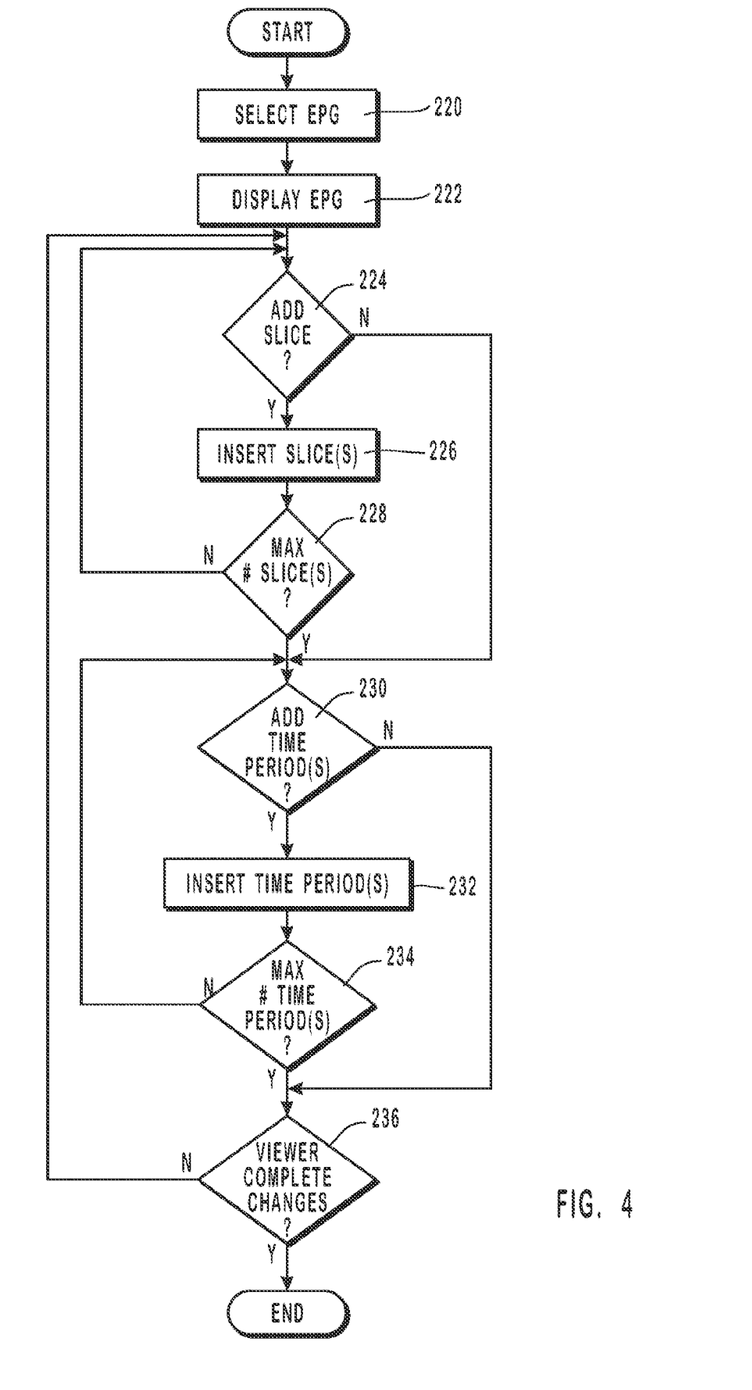
FIG. 4 is a flow diagram representing the manner by which the electronic program guide of FIG. 2 is transposed to the electronic program guide of FIG. 3.

Referring now to FIG. 4, a flow diagram illustrating an exemplary process of expanding an electronic program guide of the present invention is depicted. FIG. 4 illustrates one configuration of the flow of data associated with the enhanced electronic program guide of the present invention. One skilled in the art will appreciate and understand that various other flow diagrams would be appropriate to illustrate the functionality and features of the present invention, and would be considered an equivalent of the disclosure contained herein.

Initially, a viewer selects to examine electronic program guide 200 to identify the availability of particular programming, as represented by block 220. The viewer, in one configuration, activates input device 26 (FIG. 1) to cause management system 12 to display electronic program guide 200 within a display screen on display device 14. Consequently, management system 12 retrieves the data associated with the channel currently watched by the viewer and presents a display screen with electronic program guide 200 therein to the viewer upon display device 14, as represented by block 222. As discussed previously, electronic program guide 200 initially displays a single slice of programming information for a single period of time, i.e., a similar display format to the electronic program guide illustrated in FIG. 2 containing data of the currently viewed or accessed programming.

Subsequent to viewing electronic program guide 200, a viewer may wish to examine one or more additional entries within electronic program guide 200 to identify the availability of other programming for the current time period or other time periods. Therefore, a viewer may wish to add one or more slices of programming information, as represented by decision block 224. Hence, the viewer activates input device 26 (FIG. 1) that causes electronic program guide 200 to create one or more new slices of programming information, as represented by block 226. Consequently, management system 12 retrieves the data associated with electronic program guide 200 from mass storage device 50 (FIG. 1). The viewer may continue to activate input device 26 and insert additional slices of programming information until the electronic program guide 200 displays the maximum number of viewable slices, as represented by decision block 228. Management system 12 may insert one slice or multiple slices at one time in response to a viewer activating input device 26. Optionally, the viewer may insert a number of slices less than the maximum number of slices, as represented by a negative response to decision block 224.

Following the insertion of one or more slices within electronic program guide 200, a viewer may expand the particular time periods displayed upon display device 14. Alternatively, the viewer may expand the number of displayed time periods at any time during or subsequent to management system 12 inserting one or more slices of programming information into electronic program guide 200.

As illustrated in FIG. 4, the viewer may add one or more time periods, such as a number of time elements to the viewable portion of electronic program guide 200, as represented by decision block 230. Consequently, in response to activating input device 26 (FIG. 1), management system 12 retrieves the programming information for time periods subsequent to the currently viewed time periods, as represented by block 232. In other configurations, programming information for preceding time periods may be displayed to the viewer. Additionally, other input devices 26 and other configurations of management system 12 may access and deliver the programming in different manners known to one skilled in the art.

As with the insertion of one or more slices, a viewer may insert or include one or more time periods up to a defined maximum number of time periods, as represented by decision block 234. Data representative of the maximum number of slices and/or time periods may be stored within mass storage device 50 and/or system memory 42 of management system 12 and optionally modifiable by the viewer through input device 26 (FIG. 1).

The viewer may continue to change the display configuration of electronic program guide 200 until he or she has completed the desired changes, as represented by decision block 236. If the viewer wishes to insert additional slice of programming, he or she may add such slices before or after the viewer expands the number of time periods displayed by electronic program guide 200, and vice versa.

It may be appreciated by one skilled in the art that the viewer may manipulate electronic program guide 200 to display one or more slices and associated time periods of programming information in a variety of different manners. For example, although reference is made herein to expanding electronic program guide 200 through inserting one or more slices and one or more time periods, the present invention is configured to allow a viewer to compact or minimize the number of slices and/or periods displayed by the viewer. In this manner, the viewer may activate input device 26 to subtract or remove one or more slices and/or time periods from the displayed electronic program guide 200. Further, the present invention accommodates resetting the configuration of electronic program guide 200 when input device 26 is activated to remove the display screen and electronic program guide 200 from the viewable portion of display device 14. Stated another way, each time electronic program guide 200 is activated through input device 26, electronic program guide 200 is initially displayed to the viewer in a configuration illustrated in FIG. 2. Alternatively, each time electronic program guide 200 is activated through input device 26, electronic program guide 200 is initially displayed in accordance with a stored configuration, optionally defined by the viewer so that a greater number of slices and time periods are displayed to the viewer.

3. Full Mode Electronic Program Guide

Figure 5:
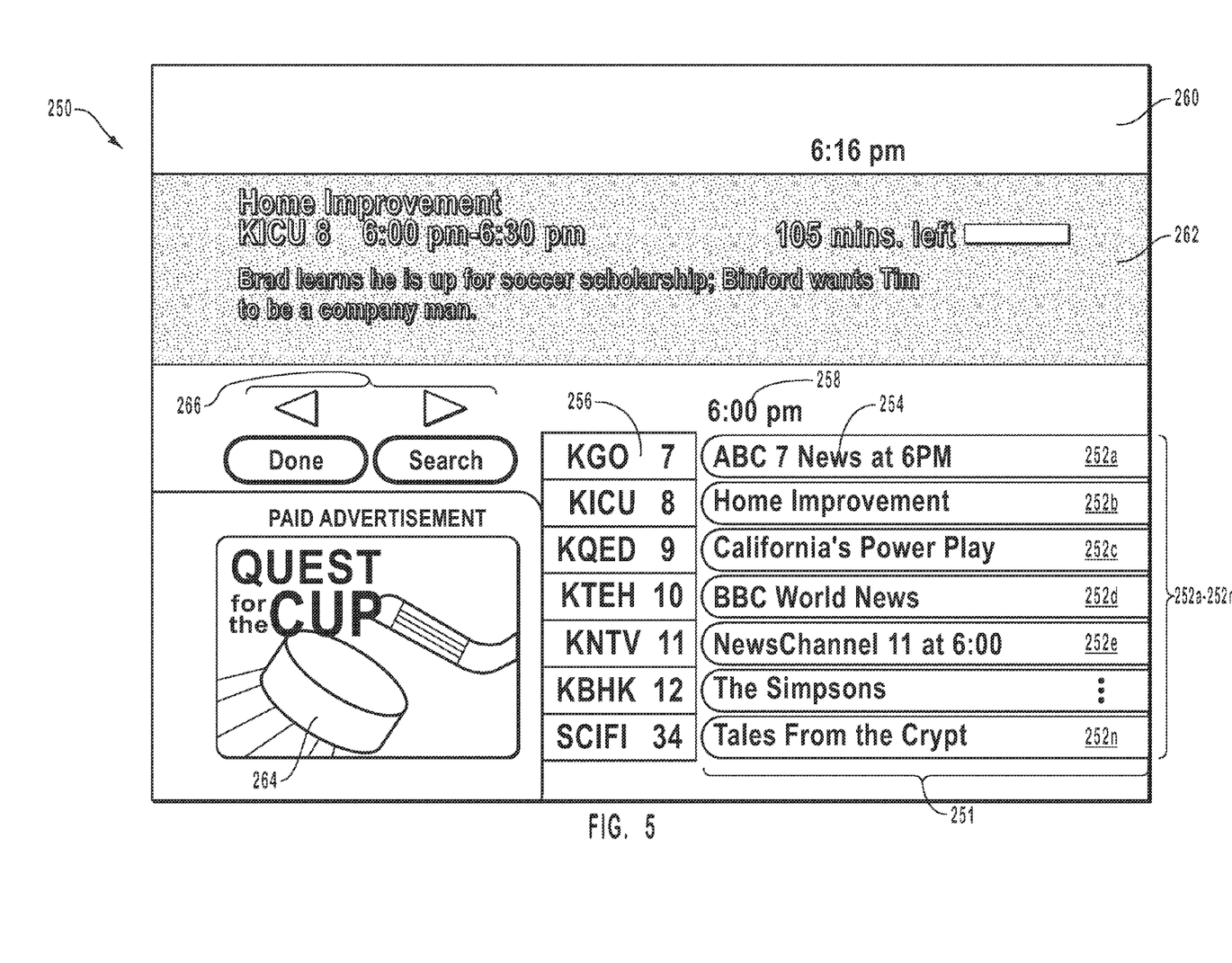
FIG. 5 illustrates an alternative configuration of an electronic program guide that may be displayed using the system of FIG. 1.

Referring now to FIG. 5, a diagram illustrating one embodiment of another electronic program guide associated with home entertainment system 10 is illustrated; the electronic program guide designated by reference numeral 250. The electronic program guide 250 is illustratively depicted in full mode where programming information is displayed to the viewer in a single column 251 of a plurality of data slices 252*a*-252. Each data slice 252*a*-252*n* provides programming information for a specific time, as referenced by a time element 258. The programming information can include a channel identifier within a channel element 256 and the name of the broadcast programming available upon such a channel, as referenced within a programming element 254.

As shown, electronic program guide 250 can include a header region 260 and a program information region 262. The header region 260 displays information about the provider of the electronic program guide or the broadcast program deliverable to the viewer. Further, header region 260 can include the current time, and other information as known by one skilled in the art. Adjacent to header region 260, in this illustrative configuration, is program information region 262. As the name implies, program information region 262 provides a viewer with details of selected or highlighted data slice 252*a*-252*n* of broadcast programming. For example, as shown, data slice 252*b* for channel KICU 8 is highlighted and information about the available program is shown in program information region 262. This information can include a summary of the program, number of minutes left to play, start time, stop time, name of the program, or the like.

Although reference is made to the program information region 262 being adjacent to header region 260, one skilled in the art can appreciate that header region 260 and program information region 262 need not be adjacent one with another. Rather, header region 260 and program information region 262 can be located at any position on electronic program guide 250, and optionally excluded from electronic program guide 250.

The electronic program guide 250 can include an advertisement region 264 within which static and/or video banner advertisements can be displayed to the viewer as they search through data slices 252*a*-252*n*. These displayed advertisements can be only static advertisements, only video advertisements, or a combination of both static and video advertisements as can be understood by one skilled in the art in light of the teaching contained herein.

To aid with navigation of data slices 252*a*-252*n*, electronic program guide 250 can include buttons 266. Such buttons 266 can be activated through a viewer manipulating input device 26 to click upon one of buttons 266, through activating a button of input device 26 to deliver a selection signal to management system 12 (FIG. 1), such as a set-top box, a combination thereof, or the like. Alternatively, electronic program guide 250 can be devoid of buttons 266 and search through data slices 252*a*-252*n* by manipulating direction or control button on input device 26 and subsequent transmission of a selection signal to management system 12 (FIG. 1), such as a set-top box. Various other methods, systems, devices, and modules are known to one skilled in the art to facilitate navigation of data slices 252*a*-252*n* by a viewer.

Figure 6:
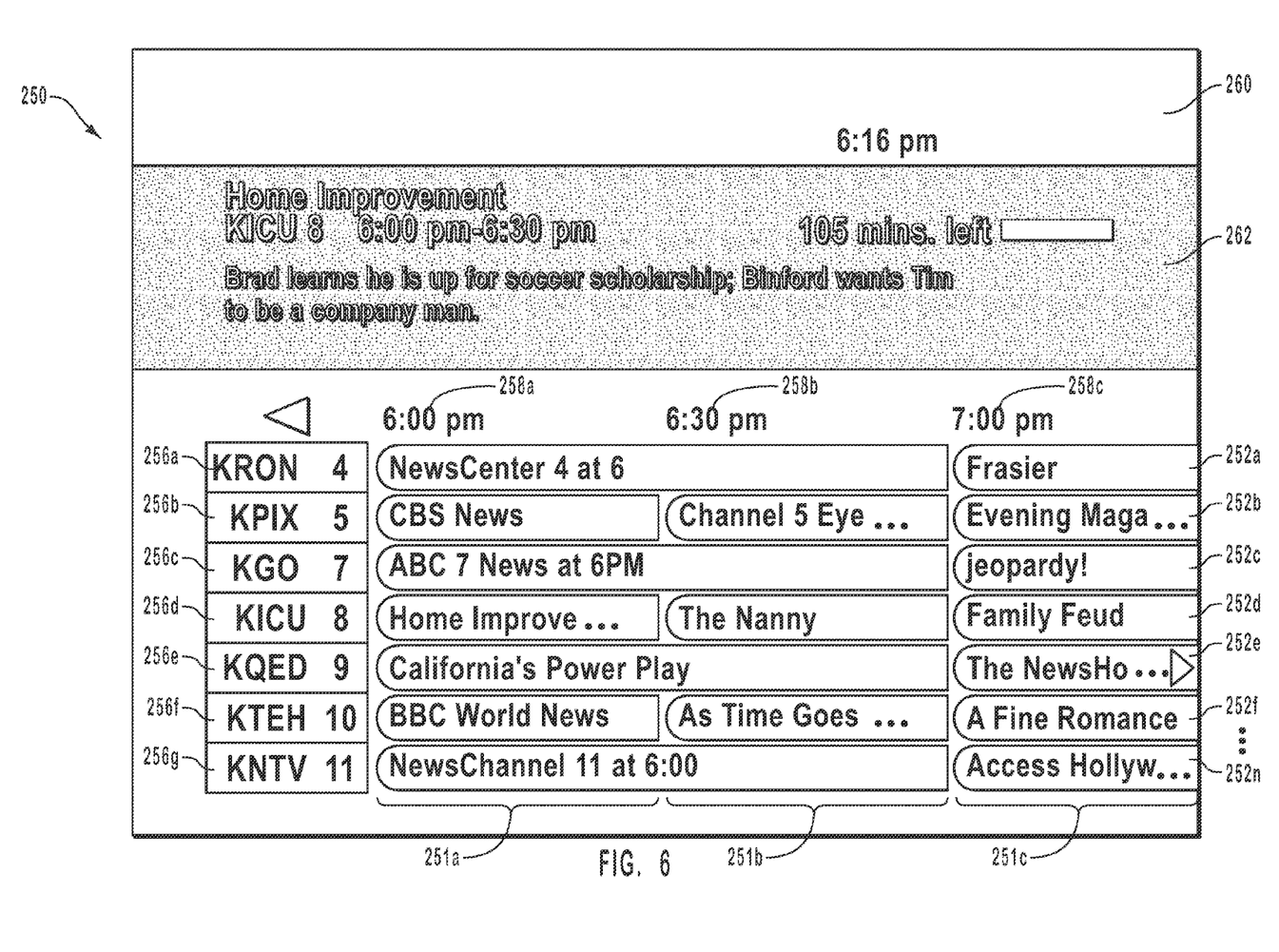
FIG. 6 illustrates the electronic program guide of FIG. 5 in an enhanced mode.

As a viewer searches vertically through data slices 252*a*-252*n*, the viewer may optionally select to view other data slices for other time periods, i.e., various data slices for programming beginning at 7:00 pm in the illustrated electronic program A guide 250. By choosing to view data slices 252*a*-252*n* for other time periods, such as by selecting button 26, manipulating input device 26, or the like, electronic program guide 250 can change to an expanded mode, as illustrated in FIG. 6. In expanded mode, electronic program guide 250 includes a plurality of columns 251*a*-251*n* of data slices 252*a*-252*n*. Consequently, electronic program guide 250 has expanded from a single column to multiple columns of data slices 252*a*252*n*.

To facilitate expansion of the columns, electronic program guide 250 can eliminate advertisement region 264 and/or program information region 262 from a viewer's view. By so doing, electronic program guide 250 has a larger viewable area and can display a greater number of data slices 252*a*-252*n* than would be possible without eliminating advertisement region 264 and/or program information region 262. Consequently, the viewer can search through the various columns 251*a*-251*n* and data slices 252*a*-252*n* and decide upon the particular channel of programming to view.

As the viewer searches through columns 251*a*-251*n* and data slices 252*a*-252*n*, the viewer can return to column 251*a*, for example, containing the electronic program guide data for the broadcast programming currently available to the viewer. Upon viewing column 251*a* and the associated data slices 252*a*-252*n*, electronic program guide 250 can optionally change from displaying multiple columns 251*a*-251*n*, as shown in FIG. 6, to displaying a single column 251, as illustrated in FIG. 5.

It can be understood that the viewer can control whether or not electronic program guide 250 changes from expanded mode to single column mode, the number of columns and/or time periods displayed to the viewer, or the like. Alternatively, internal hardware and software modules and components of management system 12, such as a set top box, can control the change between the expanded mode and the single column mode. Optionally, a combination of the above or some other manner known to one skilled in the art in light of the teaching contained herein can be used to control and facilitate increasing and decreasing the number of columns and/or time periods displayed to a viewer.

In this manner, the present invention can provide methods and systems for changing the number of data slices displayed to a viewer, whether the viewer searches the data slices in browser mode or full mode.

4. Predictive Electronic Program Guides

Figure 7:
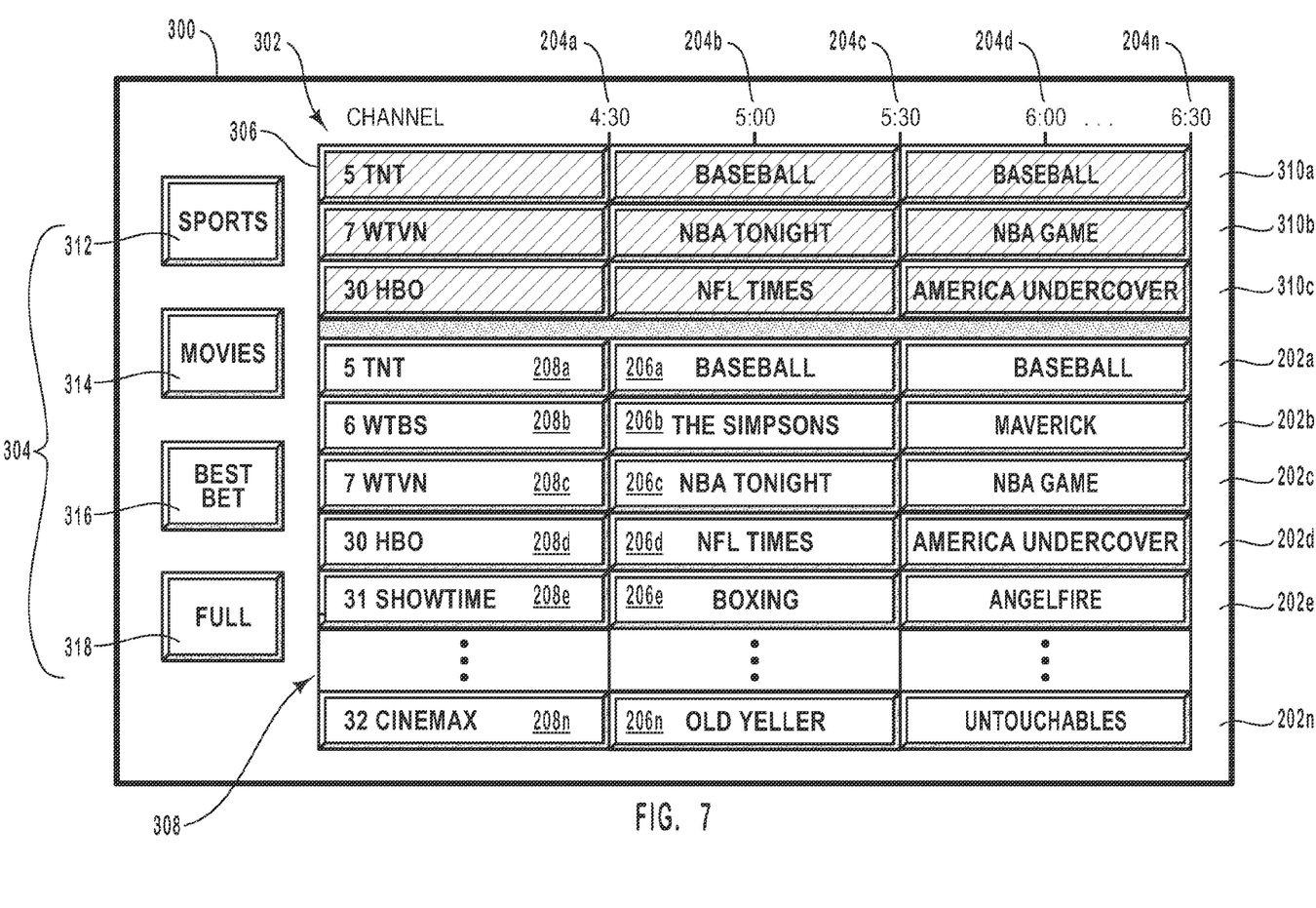
FIG. 7 illustrates an alternative configuration of an electronic program guide that may be displayed using the system of FIG. 1.

Referring now to FIG. 7, another aspect of the present invention is illustrated. Specifically, an electronic program guide in full mode is illustrated. In this configuration, electronic program guide 300 includes a programming display 302 and one or more interactive buttons 304. The programming display 302 has an upper portion 306 and a lower portion 308. Lower portion 308 of programming display 302 includes a plurality of slices 202*a*-202*n* with associated time elements 204*a*-204*n*, programming elements 206*a*-206*d*, and channel elements 208*a*-208*d*. Such slices 202*a*-202*n* are listed in numerical order to display the programming information to the viewer.

In contrast, upper portion 306 of programming display 302 includes a plurality of specialized slices 310*a*-310*c* that are separated from slices 202*a*-202*n*. Such specialized slices 310*a*-310*c* are configured to display programming selected by management system 12 (FIG. 1) upon a viewer activating one of the interactive buttons 304. As illustrated, each of the plurality of specialized slices 310*a*-310*c* has a different format or configuration from the format or configuration of slices 202*a*-202*n*. By formatting or configuring the slices differently, a viewer may identify the difference between the programming listed in specialized slices 310*a*-310*c* and those listed in slices 202*a*-202*n* with a glance. For example, there may be color differences, boundary color or texture differences, shape differences, or some other difference between specialized slices 310*a*-310*c* and slices 202*a*-202*n*. The function of specialized slices 310*a*-310*c* will be described in detail hereinafter.

As referenced above, electronic program guide 300 includes a number of interactive buttons: a sports button 312; a movie button 314; a best bet button 316; and a full button

318. Each button 312, 314, 316, and 318 activates a different function of electronic program guide 300 as will be described in detail hereinafter.

In one configuration of the present invention, sports button 312 of electronic program guide 300 is configured to cause electronic program guide 300 to display programming information regarding the available programming that relates to sports or sports events. More specifically, when a viewer activates sports button 312 by transmitting an electronic program guide selection signal to management system 12 from input device 26 (FIG. 1), management system 12 searches the electronic program guide data stored within mass storage device 50 (FIG. 1) to identify slices 202*a*-202*n* that relate to sporting events or sports. For example, as shown in FIG. 7, management system 12 (FIG. 1) would identify slices 202*a*, 202*c*, and 202*d* as relating to sporting events.

Consequently, copies of those slices of slices 202*a*-202*n* that relate to sports or sporting events are insert into specialized slices 310*a*-310*c*. For example, management system 12 retrieves copies of those related slices, e.g., slices 202*a*, 202*c*, and 202*d* and inserts the same into specialized slices 310*a*-310*c*. In this manner, a viewer may examine the available programming and services related to sports or sporting events without the need to scroll through multiple slices of information.

It may be appreciated by one skilled in the art that various other manners are applicable for displaying the selected programming information to the viewer. For example, in a configuration where electronic program guide 300 is devoid of specialized slices 310*a*-310*c*, management system 12 may insert copies of the identified slices at the top of electronic program guide 300. In another configuration, upon activating sports button 312, programming display 302 and both upper and lower portions, 306 and 308, respectively display only the available sports or sporting event programming. In still another configuration, the information displayed in specialized slices 310*a*-310*c* remains constant as a viewer scrolls through the programming contained in slices 202*a*-202*n*. In still another configuration, the information displayed in specialized slices 310*a*-310*c* changes as the viewer scrolls through the programming in slices 202*a*-202*n*. In this manner, copies of the slices 202*a*-202*n* relating to sports or sporting events that are viewable upon a particular page of electronic program guide 300 is summarized in specialized slices 310*a*-310*c*.

In a similar manner to the operation of sports button 312, by activating movie button 314 electronic program guide 300 displays programming related to movies within specialized slices 310*a*-310*n*. Specifically, when a viewer activates movie button 314, such as by employing input device 26 (FIG. 1), management system 12 searches the data stored within mass storage device 50 (FIG. 1) for slices 202*a*-202*n* that contain data related to movies. For example, as shown in FIG. 7, management system 12 (FIG. 1) would identify slice 202*n* as relating to movies. Consequently, management system 12 retrieves a copy of the related slice, e.g., slice 202*n*, and inserts the same into one or more of specialized slices 310*a*-310*c*. In this manner, a viewer may examine the available programming and services related to movies.

According to another aspect of the present invention, a viewer may activate best bet button 316 by way of input device 26 (FIG. 1). Best bet button 306 causes electronic program guide 220 to display programming that management system 12 identifies or predicts that a viewer may wish to view. Stated another way, when best bet button 316 is activated, management system 12 displays to the viewer in specialized slices 310*a*-310*c* such programming that a viewer would typically watch or access based upon the particular time period, the available programming, and/or the previous viewing activities or demographic information of the viewer.

Accordingly, management system 12 of the present invention may be configured to store within system memory 42 and/or mass storage device 50 data related to the viewing selections of the viewer over a period of time, such as a number of days, weeks, months and/or years. Furthermore, management system 12 may be optionally configured to store or access demographic information and other similar information related to the viewer, whether such information is stored locally or remotely upon a remote computer, such as remote computer 60 (FIG. 1). By using such stored information, management system 12 may predict the viewer's preferred programming selections for a particular time period based upon the available programming.

Upon activating best bet button 316, management system 12 may use a variety of different manners to predict the type of programming that a viewer may access or watch and the actual programming of the available programming that a viewer is more likely to watch than the other available programming. In one configuration, management system 12 may use a simple heuristic method or process with which to determine the predictive programming displayed in specialized slices 310*a*-310*c*. For example, management system 12 may analyze the channels watched or accessed by the viewer most frequently and display slices related to such channels in specialized slices 310*a*-310*c*. In another configuration, management system 12 may utilize sophisticated methods or processes to identify those channels to display to the viewer in specialized slices 310*a*-310*c*, such as levered filtering, complex demographic predictors, and the like. By using such predictive processes, as illustrated in FIG. 7, electronic program guide 300 may display the predictive programming for the current time period and optionally subsequent time periods.

As referenced above, electronic program guide 300 includes a full button 318. Full button 318 is configured to reset electronic program guide 300 following the activation of one or more of sports button 312, movie button 314 and best bet button 316. Consequently, upon activating full button 318, electronic program guide body 302 is modified such that only lower portion 308 is displayed to the viewer. In this manner, a viewer may retrieve electronic program guide 300 as a typical EPG that allows the viewer to scroll through and select to view information regarding various programming available at various time periods.

Figure 8:
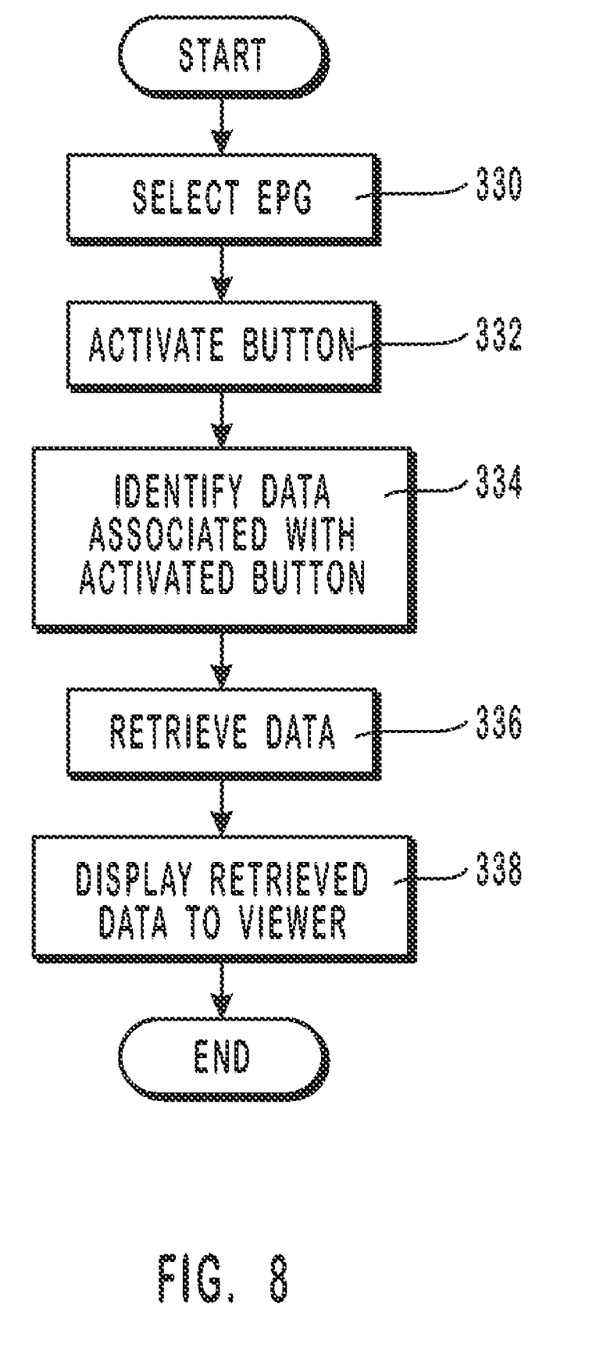
FIG. 8 illustrates a flow diagram representing the manner of inserting one or more slices into the electronic program guide of FIG. 7.

A flow diagram illustrating the flow of data in home entertainment system 10 as a viewer selects to view an electronic program guide is depicted in FIG. 8. More specifically, FIG. 8 represents a flow diagram of requests for, retrievals of, and deliveries of programming information as a viewer activates interactive buttons 304.

As shown, a viewer initially selects to view electronic program guide 300, as depicted by block 330. It may be understood that the viewer may optionally select to view programming in browser mode rather than full mode. Consequently, the functions and elements of electronic program guide 200 may be incorporated within and used with the functions and elements of electronic program guide 300. Similarly, the functions and elements of electronic program guide 300 may be incorporated within electronic program guide 200.

Once the electronic program guide has been selected, a viewer may activate one or more of the interactive buttons 304, as represented by block 332. For example, a viewer may depress one or more buttons on input device 26 to cause activation of one or more of the interactive buttons 304. In another configuration, the viewer may vocalize the name of the button they wish to activate, and subsequently management system 12 performs the appropriate functions to activate the functionality associated with the selected button.

Upon activating one of the interactive buttons 304, such as best bet button 316, management system 12 (FIG. 1) searches for programming information associated with the activated button. Stated another way, in response to receiving a electronic program guide selection signal from input device 26, management system 12 searches mass storage device 50 and/or system memory 42 to identify EPG data containing data representative of information associated with the activated button. For example, as described above, when best bet button 316 is activated, management system 12 accesses, optionally, demographic information and previous viewing activities of the viewer to identify and predict the particular type of programming that a viewer may wish to access or view. In this manner, management system 12 defines predictive criteria for use in identifying the type of programming that the viewer may wish to watch. One skilled in the art may identify various other predictive criteria that may be used to define the type of programming a viewer may desire to watch.

Following, defining the type of programming, e.g., predictive criteria, management system 12 may identify the particular programming and data associated with the programming that a viewer is more likely to watch at a particular time than others of the available programs at the same particular time. Such identifying activities are illustratively represented in FIG. 8 by block 334.

Upon identifying the data and associated one or more slices relating to the activated button, e.g., the predictive programming, management system 12 (FIG. 1) retrieves the appropriate data, as represented by block 336. Subsequently, management system 12 displays the appropriate slices and/or data in specialized slices 310a-310n, as represented by block 338. In this manner, management system 12 displays selected predictive programming in response to the viewer's selections that aid the viewer in making an informed decision as to the type and availability of programming.

The present invention may be embodied in other specific forms without departing from its spirit or essential characteristics. The described embodiments are to be considered in all respects only as illustrative and not restrictive. The scope of the invention is indicated, therefore, by the appended claims rather than by the foregoing description. All changes that come within the meaning and range of equivalency of the claims are to be embraced within their scope.

What is claimed and desired to be secured by United States Letters Patent is:

1. A method for display of electronic program guide information to a viewer while viewing a television program, wherein the electronic program guide information is organized in various slices each containing at least a channel identifier and a program element for a given time element, and wherein the viewer selectively determines how to expand the program guide information when initially presented to the viewer in browse mode so as to present additional program guide information, the method comprising the following acts:

retrieving from an electronic program guide at least a first slice of program guide information;

displaying in browse mode the retrieved slice in a window that is simultaneously presented for viewing with a displayed television program;

in response to a viewer-activated scrolling command scrolling toward a new slice that is not currently viewable to the viewer while continuing to display the retrieved slice, expanding the displayed number of slices on a slice basis by one or more additional slice of program guide information to said browse mode window corresponding at least to the new slice that is not currently viewable to the viewer; and selectively continuing to add one or more additional slices of program guide information to said browse mode window using a viewer-activated scrolling command while continuing to display the retrieved slice until a pre-defined number of slices is reached, wherein at least one data slice added to the browse mode window in response to a viewer-activated command is selected by predicting, based on demographic data, that the viewer is more likely to view the program identified by that data slice than others.

2. A system for implementing a method for display of electronic program guide information to a viewer while viewing a television program, wherein the electronic program guide information is organized in various slices each containing at least a channel identifier and a program element for a given time element, and wherein the viewer selectively determines how to expand the program guide information when initially presented to the viewer in browse mode so as to present additional program guide information, the system comprising:

a processor;

a computer memory coupled to the processor, wherein the computer memory comprises computer executable instructions that when executed by the processor cause the processor to perform the following acts:

retrieving from an electronic program guide at least a first slice of program guide information;

displaying in browse mode the retrieved slice in a window that is simultaneously presented for viewing with a displayed television program;

in response to a viewer-activated scrolling command scrolling toward a new slice that is not currently viewable to the viewer while continuing to display the retrieved slice, expanding the displayed number of slices on a slice basis by one or more additional slice of program guide information to said browse mode window corresponding at least to the new slice that is not currently viewable to the viewer; and selectively continuing to add one or more additional slices of program guide information to said browse mode window using a viewer-activated scrolling command while continuing to display the retrieved slice until a pre-defined number of slices is reached, wherein at least one data slice added to the browse mode window in response to a viewer-activated command is selected by predicting, based on demographic data, that the viewer is more likely to view the program identified by that data slice than others.

3. A computer program product comprising one or more computer readable non transitory storage media having stored thereon computer executable instructions that when executed by a processor cause the processor to perform the following acts:

retrieving from an electronic program guide at least a first slice of program guide information;

displaying in browse mode the retrieved slice in a window that is simultaneously presented for viewing with a displayed television program;

in response to a viewer-activated scrolling command scrolling toward a new slice that is not currently viewable to the viewer while continuing to display the retrieved slice, expanding the displayed number of slices on a slice basis by one or more additional slice of program guide information to said browse mode window corresponding at least to the new slice that is not currently viewable to the viewer; and selectively continuing to add one or more additional slices of program guide information to said browse mode window using a viewer-activated scrolling command while continuing to display the retrieved slice until a pre-defined number of slices is reached, wherein at least one data slice added to the browse mode window in response to a viewer-activated command is selected by predicting, based on demographic data, that the viewer is more likely to view the program identified by that data slice than others.

\* \* \* \* \*